(12) United States Patent
Liu

(10) Patent No.: US 9,232,056 B2
(45) Date of Patent: Jan. 5, 2016

(54) APPARATUS FOR BLOCKING UNWANTED TELEPHONE CALLS AND FAXES

(71) Applicant: Xiang Liu, Irvine, CA (US)

(72) Inventor: Xiang Liu, Irvine, CA (US)

(*) Notice: Subject to any disclaimer, the term of this patent is extended or adjusted under 35 U.S.C. 154(b) by 0 days.

(21) Appl. No.: 14/243,721

(22) Filed: Apr. 2, 2014

(65) Prior Publication Data

US 2015/0288817 A1    Oct. 8, 2015

(51) Int. Cl.
  *H04M 1/56*  (2006.01)
  *H04M 15/06* (2006.01)
  *H04M 3/436* (2006.01)
  *H04M 3/02*  (2006.01)
  *H04M 3/42*  (2006.01)

(52) U.S. Cl.
  CPC .............. *H04M 3/4365* (2013.01); *H04M 3/02* (2013.01); *H04M 3/42059* (2013.01)

(58) Field of Classification Search
  CPC ..... H04M 3/426; H04M 1/663; H04M 15/06; H04M 3/42059; H04M 65/1079
  USPC ............. 379/142.01, 142.02, 142.04, 142.06, 379/142.07, 142.12, 142.13, 142.17, 210.02
  See application file for complete search history.

(56) References Cited

U.S. PATENT DOCUMENTS

| | | | |
|---|---|---|---|
| 5,351,289 A * | 9/1994 | Logsdon et al. | 379/142.04 |
| 5,995,603 A * | 11/1999 | Anderson | 379/142.05 |
| 6,618,473 B1 * | 9/2003 | Davis | 379/142.05 |
| 7,231,029 B1 * | 6/2007 | Kirkpatrick | 379/210.02 |
| 7,295,660 B1 * | 11/2007 | Higginbotham et al. | 379/196 |
| 8,139,747 B2 * | 3/2012 | Cha | 379/210.02 |
| 8,270,588 B2 * | 9/2012 | Schwartz | 379/210.02 |
| 8,369,494 B2 * | 2/2013 | Cha | 379/88.12 |
| 8,472,599 B1 * | 6/2013 | White | 379/142.02 |
| 8,577,002 B2 * | 11/2013 | Stein et al. | 379/142.06 |
| 8,917,843 B2 * | 12/2014 | Sharpe | 379/142.15 |
| 2004/0086101 A1 * | 5/2004 | Katz | 379/210.02 |
| 2004/0131164 A1 * | 7/2004 | Gould | 379/88.19 |
| 2004/0234062 A1 * | 11/2004 | Jones | 379/210.02 |
| 2008/0292085 A1 * | 11/2008 | Pappas | 379/210.02 |
| 2014/0198903 A1 * | 7/2014 | Cha, Steve | 379/88.12 |

* cited by examiner

*Primary Examiner* — Binh Tieu

(74) *Attorney, Agent, or Firm* — Stetina Brunda Garred & Brucker

(57) ABSTRACT

An apparatus for blocking unwanted calls is disclosed. The apparatus incorporates a whitelist which the user can program so that known friendly callers are not interrupted by the apparatus. The apparatus also incorporates a blacklist which automatically rejects known unwanted callers so that the user is not interrupted by these calls. Additionally, the apparatus allows the user to easily add new numbers to either the blacklist or white list and also to delete numbers from the white list, blacklist or master list of caller IDs. For new numbers, callers are presented with a simple but yet effective message that states that the caller should hang up if the caller is a solicitor or telemarketer, or otherwise press zero so that the apparatus can allow the call to go through to the telephone.

8 Claims, 5 Drawing Sheets

APPARATUS FOR BLOCKING UNWANTED TELEPHONE CALLS AND FAXES

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various embodiments and aspects discussed herein relate to an apparatus for blocking unwanted calls. Telephone marketing over the years has grown into a multibillion-dollar industry. As such, companies will call a large number of homes either through machine automation or with the help of live people. Unfortunately, homeowners do not want to be bothered by these telemarketing calls. Moreover, these calls are typically made when the families do not want to be bothered such as dinnertime. Prior art call blocking apparatuses exists but may be complicated to use and ineffective at blocking unwanted calls.

Accordingly, there is a need in the art for an improved call blocking apparatus.

BRIEF SUMMARY

The various aspects and embodiments described herein address the needs discussed above, discussed below and those that are known in the art.

An apparatus for blocking unwanted calls is disclosed. The apparatus may be connected to the telephone in series or in parallel in the home. Regardless, the apparatus intercepts a telephone signal and determines whether the caller ID information contained in the telephone signal is found on a whitelist, blacklist or on neither lists. If the caller ID is on the whitelist, then the call is not interrupted and the telephone signal is allowed to access the telephone so that the user may answer the telephone. If the caller ID is on the blacklist, then the telephone signal is not allowed to access the telephone and the apparatus may hang up on the caller. If the caller ID is on neither the blacklist or the whitelist, then the caller is presented with a message that indicates that should the caller be a telemarketer or solicitor, the caller should hang up or if the caller is not a telemarketer or solicitor that the caller should press zero. If the apparatus detects a zero tone, then the telephone signal is allowed to access the telephone so that the telephone may ring and the user may pick up the call.

More particularly, an apparatus for blocking unwanted telephone calls is disclosed. The apparatus may comprise a line input, a line output and a processor. The line input may be attached to a telephone jack for receiving a telephone signal which includes a caller id. The line output may be attached to a telephone having a caller id capability. The processor may perform the steps of receiving the telephone signal including the caller id information; comparing the caller id information to a whitelist; and ringing the telephone if the caller id information is matched to a telephone number on the whitelist.

The steps of the processor may further comprise blocking the telephone signal from the telephone if the caller id information is matched to a telephone number on a blacklist; and presenting a preprogrammed new message to the incoming caller if the caller id is not matched to a telephone number on either of the blacklist or the whitelist.

The processor further performs the steps of presenting one caller id information to the user from a list of new caller id information; adding the presented caller id information to the whitelist if the user depresses an accept button; and adding the presented caller id information to the blacklist if the user depresses a reject button.

The processor may further perform the steps of blocking the telephone signal from the telephone if the telephone signal does not include caller id information.

The preprogrammed new message may indicate that the caller should hang up if the caller is a telemarketer, or press a number on a keypad of the telephone.

The processor may further perform the steps of deleting one telephone number from a master list of caller IDS, blacklist or whitelist by depressing a delete button.

In another aspect, a home with a telephone system for blocking unwanted telephone calls is disclosed. The home may comprise a communication link, a first telephone jack, a first telephone cable, an apparatus and a first telephone. The communication link may be in communication with a telephone company for receiving a telephone signal from the telephone company. The first telephone jack may be in communication with the telephone link for providing the telephone signal to an interior of the home. The first telephone cable may be connected to the first telephone jack. The apparatus may block unwanted telephone calls. The apparatus may be in communication with the first telephone cable for receiving the telephone signal. The apparatus may comprise a processor performing the steps of receiving the telephone signal including caller id information; comparing the caller id information to a whitelist; ringing the telephone if the caller id information is matched to a telephone number on the whitelist; a first telephone in communication with the apparatus and controlled by the apparatus. In this setup, the apparatus and the first telephone are connected to each other in series.

The home may further comprise a second telephone jack in communication with the telephone link for providing the telephone signal to the interior of the home. A second telephone cable may be connected to the second telephone jack. A second telephone may be in communication with the second telephone cable so that the second telephone is connected to a telephone system of the home in parallel to the first telephone.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
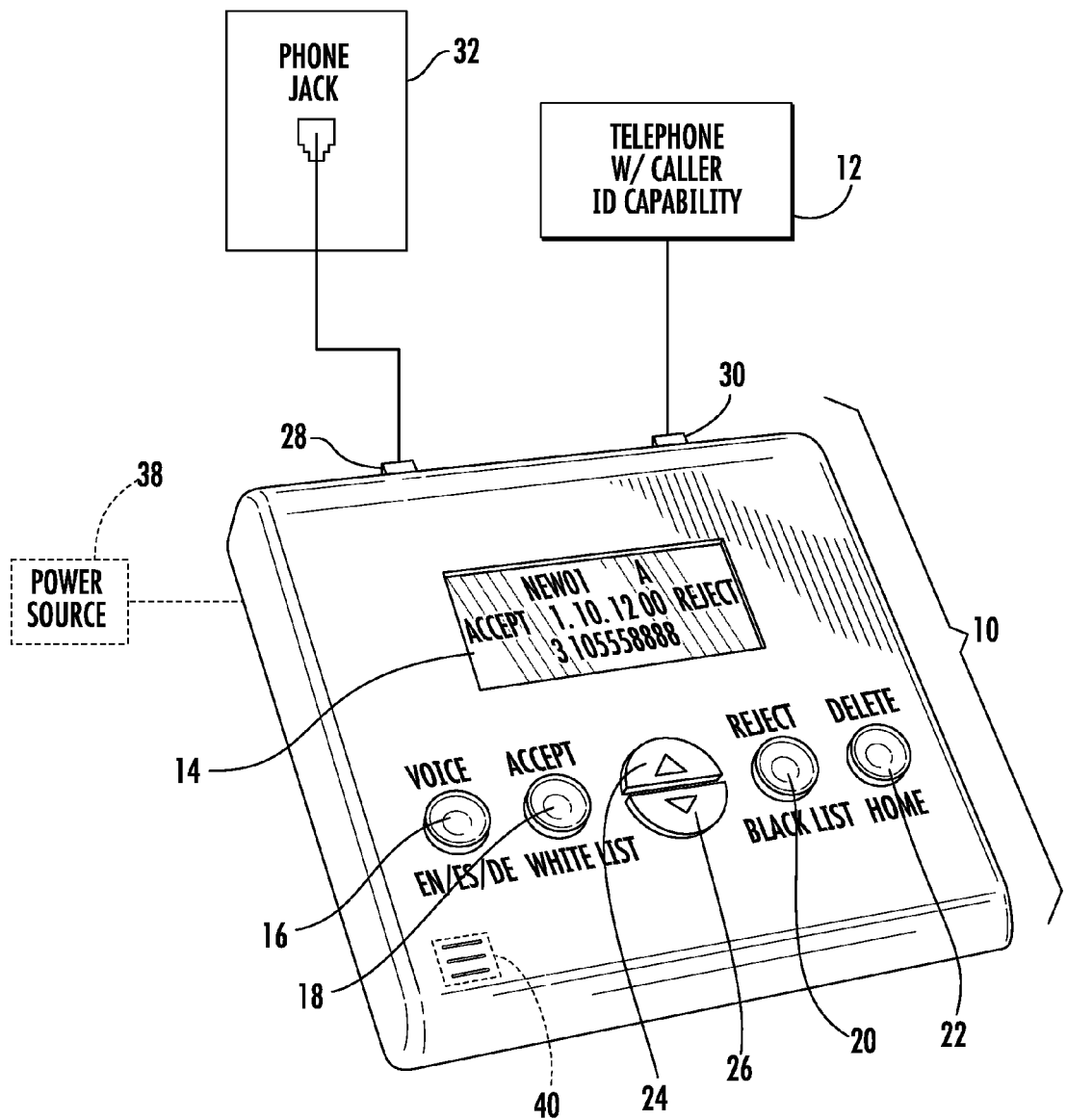
FIG. 1 is a perspective view of an apparatus for blocking unwanted calls.

Referring now to the drawings, an apparatus 10 for blocking unwanted telephone calls that is easy to use and works is disclosed. The apparatus 10 accepts all incoming calls and compares the incoming caller identification (ID) to a whitelist of caller IDs. If the incoming caller ID is not found on the whitelist of caller IDs, then the call is not allowed to access the telephone 12 and the caller is presented with a pre-recorded message that indicates that he or she should hang up if the caller is a telemarketer or solicitor of any kind or press zero. Friends and family that call the user's telephone and that are on the whitelist will not hear the pre-recorded message. The call is allowed to access the telephone 12 without the pre-recorded message prompt so that the user (i.e., homeowner) may easily answer the call. Thereafter, the user may add the caller ID of the friend or family to the whitelist of caller IDs by depressing an add to whitelist button. If the caller hangs up, then the user may easily add the caller ID of the telemarketer to the blacklist of caller IDs by depressing an add to blacklist button. Due to the whitelist and blacklist of caller IDs, friends and family are interrupted only once by the pre-recorded message while Robo calls are always blocked and telemarketers are significantly discouraged and effectively do not press zero.

Referring now to FIG. 1, the apparatus 10 has a display 14 and a plurality of buttons 16-26. The buttons 18-26 are used to access a master list of caller IDs, the whitelist of caller IDs, the blacklist of caller IDs and to add or delete a caller ID from the whitelist, blacklist and master list. The button 16 is used to select a language for the message. The apparatus 10 additionally has two phone jacks 28, 30.

Figure 2:
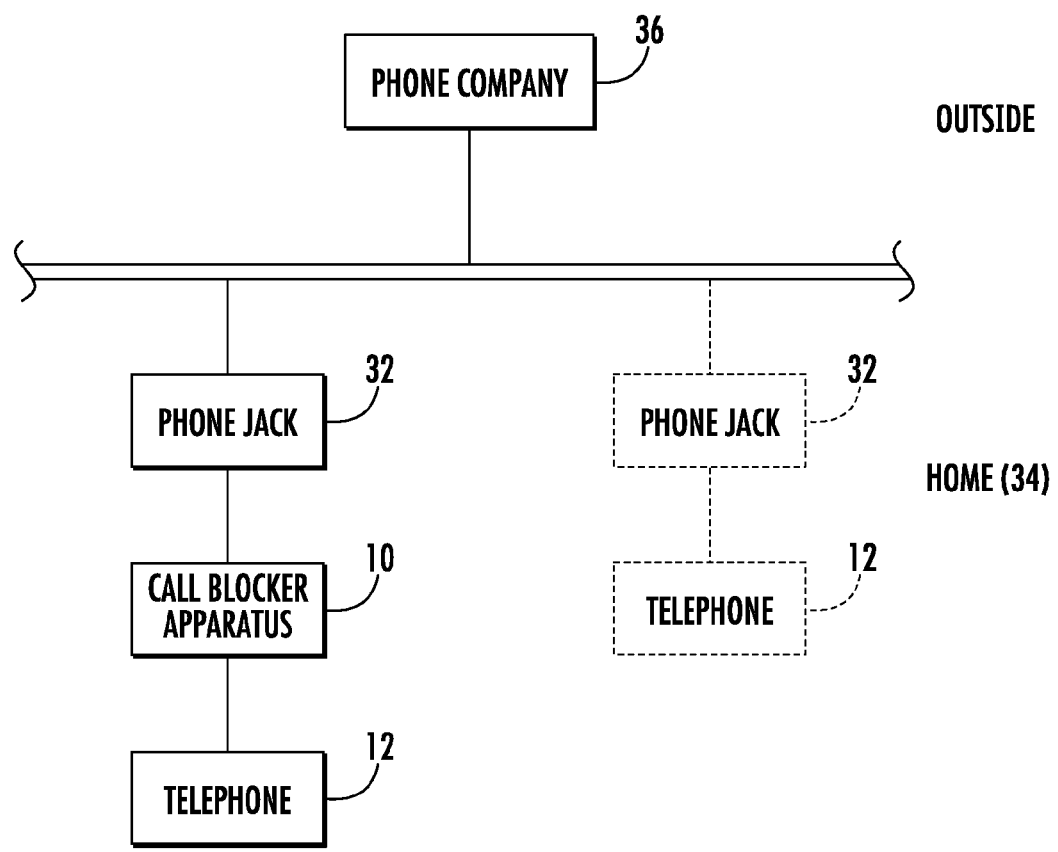
FIG. 2 is a first schematic diagram for setting up the apparatus and telephone in a home.

Referring now to FIG. 2, the phone jack 28 may be in electrical communication with the phone jack 32 that comes into the home 34 from the phone company 36. The phone jack 30 may be in electrical communication with the telephone 12 in series. In this setup, the apparatus 10 receives all calls coming in through the phone jack 32 and does not allow the telephone signal to ring the telephone 12. The apparatus 10 either (1) allows the caller ID from the telephone signal to reach the telephone 12 and be displayed on the telephone display or (2) sends only the caller ID read from the telephone signal to the telephone 12 without ringing the telephone 12. Additional telephones 12 may be connected to other phone jacks 32 located in the home 34. When a telephone signal comes into the home 34 via the telephone company 36, the telephone signal is received by the apparatus 10 and the telephone 12 which is directly connected to the phone jack 32 shown in dash lines in FIG. 2 does not ring. The telephone 12 directly connected to the phone jack 32 at other locations in the house rings only once. The apparatus 10 retrieves the caller ID from the telephone signal which is compared to the whitelist and blacklist in the apparatus 10. If the caller ID is matched to a number on the whitelist, then the telephone signal is allowed to continue ringing the telephone 12 directly connected to the phone jack 32 at other locations in the house and the telephone 12 directly connected to the apparatus 10. If the caller ID is matched to a number on the blacklist, then the telephones 12 are not allowed to ring and the call is terminated by the apparatus 10. The telephone 12 is directly connected to the other jacks 32 throughout the home 34 may ring only once. Thereafter, the apparatus 10 blocks the call. If the caller ID is new, then the apparatus 10 prompts the caller with the pre-recorded message.

Figure 3:
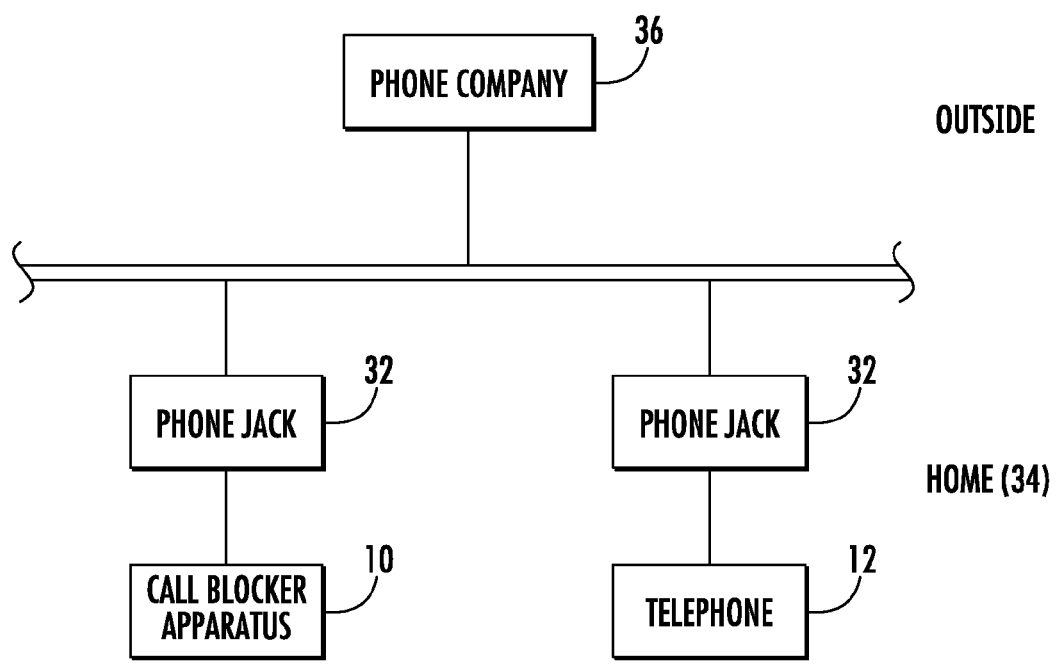
FIG. 3 is a second schematic diagram for setting up the apparatus and telephone in the home.

Other configurations are also contemplated. By way of example and not limitation, referring now to FIG. 3, the apparatus 10 may be in electrical communication with phone jack 32. A telephone 12 is not directly connected to the apparatus 10. Instead, the telephone 12 may be connected to a different phone jack 32 in the home 34. When the telephone signal comes in from the phone company 36, the telephone signal is received by both the apparatus 10 and the telephone 12. As such, the telephone 12 rings once. The apparatus 10 retrieves the caller ID information from the telephone signal which is compared to the whitelist and blacklist in the apparatus 10. If the caller ID is matched to a number on the whitelist, then the telephone signal is allowed to continue ringing the telephone 12. If the caller ID is matched to a number on the blacklist, then the telephone is not allowed to ring and the call is terminated by the apparatus 10. If the caller ID is new, then the apparatus 10 does not allow the telephone 12 to ring and prompts the caller with the pre-recorded message. The apparatus 10 may be placed in series (see FIG. 2) with the telephone 12. Alternatively, the apparatus 10 may be placed in parallel (see FIG. 3) with the telephone 12.

Figure 4:
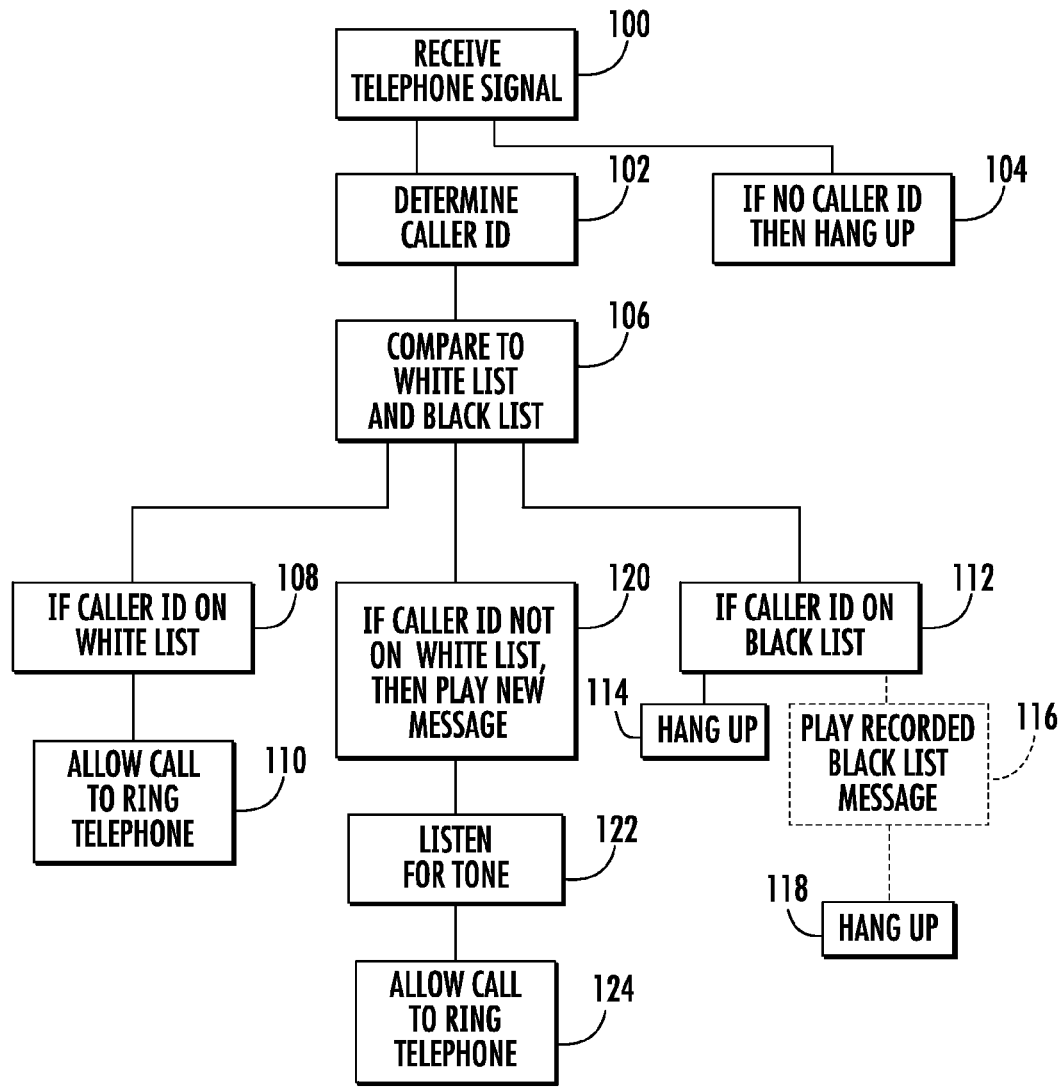
FIG. 4 is an operational flowchart for handling incoming calls received by the apparatus.

Referring now to FIG. 4, a flowchart of the steps that the apparatus 10 takes when receiving a telephone signal is shown. The apparatus 10 receives 100 the telephone signal from the telephone company 36 through the phone jack 32. The apparatus 10 then determines 102 the caller ID from the telephone signal. If the telephone signal does not contain a caller ID, then the apparatus 10 hangs up 104 on the caller. Alternatively and optionally, the apparatus 10 may answer the call and provide a different pre-recorded message that the call is being hung up 104 since the caller has a blocked caller ID and that should the caller desire to speak to the homeowner, then the caller should unblock their caller ID. After presenting the caller with such message, then the apparatus 10 may hang up 104 on the caller.

Provided that the telephone signal contains the caller ID information, the apparatus 10 retrieves the caller ID information and compares 106 the caller ID in the telephone signal to the caller IDs on the whitelist and the blacklist. If the caller ID is matched 108 to a number on the whitelist, then the apparatus 10 allows the telephone signal to access the telephone 12 so that the telephone 12 will ring 110 and the user can answer the call. If the caller ID is matched 112 to a number on the blacklist, then the apparatus 10 either hangs up 114 or may optionally play 116 the pre-recorded blacklist message discussed above then hang up 118. If the caller ID is not matched to a number on the whitelist or the blacklist but is a new number 120, then the apparatus 10 prompts the caller with the pre-recorded new message. The new message states that if the caller is a telemarketer or solicitor that he or she should hang up 114, or press zero if he or she is not a telemarketer or solicitor. After playing the new message, the apparatus 10 listens 122 for a tone. If the apparatus 10 detects that the zero button or the tone indicated in the message has been depressed, then the apparatus 10 allows 124 the telephone signal to access the telephone 12.

Figure 5:
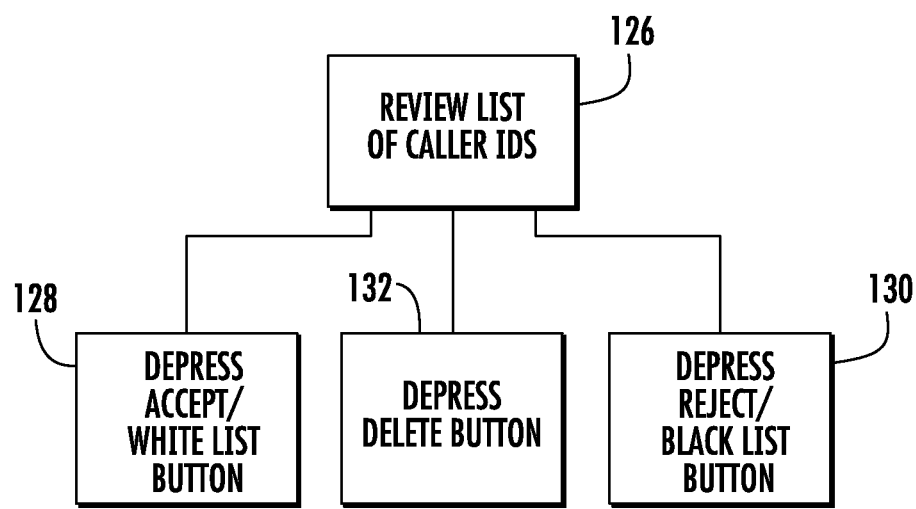
FIG. 5 is a flowchart for assigning and deleting caller IDs from a whitelist, blacklist or a master list of caller IDs.

Referring now to FIGS. 1 and 5, the apparatus 10 reads the caller ID from the telephone signal of all the incoming calls. It places all of the caller IDs on a master list of caller IDs which is shown on the display 14. The user may scroll up or down the list (i.e., review 126 list of caller IDs) by depressing the up button 24 or the down button 26. For each of the caller IDs, the display 14 will indicate whether the caller ID is on the whitelist, blacklist or on neither lists (i.e., new). If the caller ID is on the whitelist, then the display 14 will show the word "ACCEPT". If the caller ID is on the blacklist, then the display 14 will show the word "REJECT". If the caller ID is neither on the whitelist or the blacklist, then the display 14 will show the word "NEW". If the caller ID is new, then the user may place the caller ID on the whitelist by depressing 128 the whitelist button 18 or place the caller ID on the blacklist by depressing 130 the blacklist button 20. The user may also delete the caller ID from the whitelist, blacklist or the master caller ID list by scrolling to the number by depressing the up or down buttons 24, 26 and depressing 132 the delete button 22.

The apparatus 10 may optionally have three language presets. By way of example and not limitation, the apparatus 10 may present the messages in English, Spanish or German. The language may be selected by depressing the voice button 16 one or more times. For English, the letter A will be shown on the display 14. For Spanish, the letter B will be shown on the display 14. For German, the letter C will be shown on the display 14. Other languages are also contemplated.

Optionally, the apparatus 10 may also have the capability of allowing the user to record his or her own voice so that the messages provided to the callers are in the homeowner's own voice. To this end, the apparatus 10 may be supplied with power 38 to operate the microphone 40. The apparatus 10 may prompt the user to speak into the microphone 40 to record the messages to be provided to the caller during operation of the apparatus 10. The apparatus 10 may also have memory and a processor to store the prerecorded messages or personalized messages of the user which are provided to the caller during operation of the apparatus 10.

The above description is given by way of example, and not limitation. Given the above disclosure, one skilled in the art could devise variations that are within the scope and spirit of the invention disclosed herein, including various ways of arranging the buttons 16-26. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An apparatus for blocking unwanted telephone calls, the apparatus comprising:
    a line input attachable to a telephone jack for receiving a telephone signal from a caller, the telephone signal including a caller ID;
    a line output attachable to a telephone having a caller ID capability;
    a processor performing the following steps;
        receiving the telephone signal including the caller ID;
        comparing the caller ID to a whitelist;
        ringing the telephone if the caller ID is matched to a telephone number on the whitelist;
        presenting a preprogrammed new message prompting the caller to press a key on a keypad if the caller ID is not matched to a telephone number on either of a blacklist or the whitelist; and
        ringing the telephone immediately when the person presses the key on the keypad.

2. The apparatus of claim 1 wherein the steps of the processor further comprises: blocking the telephone signal from the telephone if the caller ID is matched to a telephone number on the blacklist.

3. The apparatus of claim 2 wherein the processor further performs the steps of:
    presenting one caller ID to the user from a list of new caller IDs;
    adding the one caller ID to the whitelist if the user depresses an accept button;
    adding the one caller ID to the blacklist if the user depresses a reject button.

4. The apparatus of claim 1 wherein the processor further performs the steps of blocking the telephone signal from the telephone if the telephone signal does not include the caller ID.

5. The apparatus of claim 1 wherein the preprogrammed new message indicates that the caller should hang up if the caller is a telemarketer, or press the key on the keypad of a telephone.

6. The apparatus of claim 3 wherein the processor further performs the steps of deleting one telephone number from a master list of caller IDS, blacklist or whitelist by depressing a delete button.

7. A home with a telephone system for blocking unwanted telephone calls, the home comprising:
    a communication link to a telephone company for receiving a telephone signal from the telephone company;
    a first telephone jack in communication with the telephone link for providing the telephone signal to an interior of the home;
    a first telephone cable connected to the first telephone jack;
    an apparatus for blocking unwanted telephone calls, the apparatus in communication with the first telephone cable for receiving the telephone signal, the apparatus comprising a processor performing the steps of:
        receiving the telephone signal including caller ID information;
        comparing the caller ID information to a whitelist;
        ringing the telephone if the caller ID information is matched to a telephone number on the whitelist;
        presenting a preprogrammed new message prompting the caller to press a key on a keypad if the caller ID is not matched to a telephone number on either of a blacklist or the whitelist; and
        ringing the telephone immediately when the caller presses the key on the keypad;
    a first telephone in communication with the apparatus and controlled by the apparatus;
    wherein the apparatus and the first telephone are connected to each other in series.

8. The home of claim 7 further comprising a second telephone jack in communication with the telephone link for providing the telephone signal to the interior of the home, a second telephone cable connected to the second telephone jack, and a second telephone in communication with the second telephone cable so that the second telephone is connected to a telephone system of the home in parallel to the first telephone.

* * * * *